United States Patent
Kim et al.

(10) Patent No.: US 8,065,595 B2
(45) Date of Patent: Nov. 22, 2011

(54) APPARATUS AND METHOD FOR ALLOCATING MEMORY SPACE IN A MOBILE COMMUNICATION SYSTEM

(75) Inventors: Oh-Seok Kim, Seoul (KR); Young-Yong Lee, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 763 days.

(21) Appl. No.: 12/194,807

(22) Filed: Aug. 20, 2008

(65) Prior Publication Data

US 2009/0055702 A1 Feb. 26, 2009

(30) Foreign Application Priority Data

Aug. 20, 2007 (KR) .................. 10-2007-0083318

(51) Int. Cl.
*H03M 13/03* (2006.01)
(52) U.S. Cl. ......... 714/790; 714/755; 370/331; 375/265
(58) Field of Classification Search ............ 714/755, 714/786, 790; 370/331; 375/265
See application file for complete search history.

(56) References Cited

U.S. PATENT DOCUMENTS

| 7,251,285 | B2 * | 7/2007 | Lee et al. | 375/262 |
| 7,317,680 | B2 * | 1/2008 | Ma et al. | 370/203 |
| 7,415,263 | B2 * | 8/2008 | Kutz et al. | 455/334 |
| 7,657,815 | B2 * | 2/2010 | Seidel et al. | 714/748 |
| 7,746,961 | B2 * | 6/2010 | Reial et al. | 375/341 |
| 7,844,013 | B2 * | 11/2010 | Hoshino et al. | 375/295 |
| 7,864,735 | B2 * | 1/2011 | Ma et al. | 370/331 |
| 7,929,495 | B2 * | 4/2011 | Dominique et al. | 370/329 |

* cited by examiner

*Primary Examiner* — Esaw Abraham
(74) *Attorney, Agent, or Firm* — Jefferson IP Law, LLP

(57) ABSTRACT

An apparatus and method for receiving data when an HS-SCCH is not used in a mobile communication system are provided. In the apparatus and method, retransmission data is received, parameters including information about initial transmission data are acquired from the retransmission data, the initial transmission data is retrieved from a second-rate dematching input buffer based on the information about the initial transmission data, second-rate dematching is performed on the initial transmission data and the retransmission data, and first output data is generated by soft-combining the second rate-dematched initial transmission data with the second rate-dematched retransmission data. Accordingly, memory usage can be reduced.

19 Claims, 5 Drawing Sheets

APPARATUS AND METHOD FOR ALLOCATING MEMORY SPACE IN A MOBILE COMMUNICATION SYSTEM

PRIORITY

This application claims the benefit under 35 U.S.C. §119 (a) of a Korean Patent Application filed in the Korean Intellectual Property Office on Aug. 20, 2007 and assigned Serial No. 2007-83318, the entire disclosure of which is hereby incorporated by reference.

BACKGROUND OF THE INVENTION

1. Field of the Invention

The present invention relates to an apparatus and method for optimizing the size of a memory in a Mobile Station (MS). More specifically, the present invention relates to an apparatus and method for optimizing the size of a buffer that an MS allocates for soft-combining of retransmitted data when it operates in a High-Speed Shared Control Channel-less mode (HS-SCCH-less mode) according to an asynchronous mobile communication system standard, the 3rd Generation Partnership Project (3GPP) REL-7 standard.

2. Description of the Related Art

The HS-SCCH-less mode is defined in the 3GPP REL-7 standard. The HS-SCCH-less mode is a technique in which, when small-size Transport Blocks (TBs) are transmitted, their initial transmission version is transmitted without the HS-SCCH, to thereby increase cell capacity.

FIG. 1 illustrates a conventional operation for transmitting channels in the HS-SCCH-less mode.

Referring to FIG. 1, a Base Station (BS) transmits initial transmission data to an MS without using an HS-SCCH, i.e. in the HS-SCCH-less mode. That is, upon receipt of Channel Quality Information (CQI) from the MS in step A), the BS transmits initial High-Speed Downlink Shared CHannel (HS-DSCH) data to the MS on a High-Speed Physical Downlink Shared CHannel (HS-PDSCH) without using the HS-SCCH in step B).

The HS-PDSCH transmission has the following features in the HS-SCCH-less mode. Only Quadrature Phase Shift Keying (QPSK) is used as a modulation scheme and only four TB formats or sizes are available. The BS notifies the MS of these TB sizes before transmitting the HS-PDSCH. The HS-PDSCH has a 24-bit Cyclic Redundancy Check (CRC) that is MS-specific like that of the HS-SCCH.

Up to two HS-PDSCH channelization codes are available to the MS. The BS preliminarily allocates an HS-PDSCH channelization code before transmitting the HS-PDSCH to the MS and the MS receives the HS-PDSCH using the allocated HS-PDSCH channelization code. Then the MS performs blind decoding on the HS-PDSCH by sequentially applying the four TB sizes to the HS-PDSCH. If the CRC of the HS-PDSCH indicates an error during the decoding, the MS requests a retransmission of the HS-PDSCH. However, there are restrictions regarding Hybrid Automatic Repeat reQuest (HARQ) as a retransmission scheme as follows.

Up to two retransmissions are allowed. Redundancy Versions (RVs) that are available are semi-fixedly defined according to retransmission numbers. Table 1 below lists transmission numbers versus redundancy versions.

TABLE 1

| Transmission number | RV (Redundancy Version) |
| --- | --- |
| Initial transmission | 0 |
| Second transmission (first retransmission) | 3 |
| Third transmission (second retransmission) | 4 |

When a retransmission is requested in the HS-SCCH-less mode, the BS transmits the following information to the MS on an HS-SCCH of type 2.

(1) 2-bit TB size Information indicating the size of a retransmitted HS-DSCH TB;

(2) a 3-bit Pointer to the previous transmission (PTR) indicating the position of the previously transmitted data, i.e. the position of an Incremental Redundancy (IR) buffer at which there is data to be soft-combined with a retransmitted bit stream; and (3) 1-bit second or third transmission information indicating a current retransmission number. If the second or third transmission information is 0, this indicates a second transmission and if the second or third transmission information is 1, this indicates a third transmission.

FIG. 2 is a timing diagram of a conventional MS operation.

Referring to FIG. 2, after entering the HS-SCCH-less mode, the MS operates as follows.

First, the MS demodulates a received HS-PDSCH and determines whether the HS-PDSCH is type 1. If the HS-PDSCH is neither type 1 nor type 2, the MS blind-decodes the HS-PDSCH with respect to all available TB sizes. Herein, type 2 means retransmission.

If the CRC of the blind-decoded HS-PDSCH is good, the MS provides packets included in the HS-PDSCH to a Medium Access Control (MAC) layer.

On the other hand, if the blind-decoded HS-PDSCH has a bad CRC with respect to every TB size, the MS buffers the current data, i.e., second rate-dematched data with respect to every TB size at a position computed by equation (1), for soft-combing with later retransmitted data in step A).

$$IR \text{ buffer offset} = [5 \times CFN + \text{subframe number}] \bmod 13 \qquad (1)$$

where CFN represents Connected Frame Number (CFN).

Then the MS demodulates a received HS-SCCH and, if the HS-SCCH is type 2, determines that a retransmission takes place in the HS-SCCH-less mode.

The MS calculates parameters for rate dematching and channel coding of the currently received data by detecting a TB size and a retransmission number from information included in the HS-SCCH in step B).

The MS calculates the IR buffer offset of the initial transmission using a PTR acquired from the HS-SCCH of type 2, a current CFN, and a current subframe number by $$\text{Previous } IR \text{ buffer offset} = [5 \times CFN + \text{subframe number} - 6 - PTR] \bmod 13 \qquad (2)$$

where PTR represents "Pointer to the previous transmission".

After second-rate dematching of the current received data, the MS calculates the previous IR buffer offset by equation (2) and soft-combines the second rate-dematched data of the current bit stream with the data buffered at a position of the IR buffer determined by the TB size in step C).

The MS performs first-rate dematching and channel decoding on the soft-combined data and checks the CRC of the channel-decoded data.

If the CRC indicates no error, the MS provides the decoded data to the MAC layer. Otherwise, the MS requests and waits for a retransmission.

In summary, the MS subjects initial transmission data to blind decoding and sequentially stores second rate-dematched data of the initial transmission data in the IR buffer according to an IR buffer offset and all available TB sizes.

If the initial transmission data turns out bad based on a CRC check with respect to every TB size, the MS keeps the buffered data in the IR buffer. Then, the MS demodulates a received HS-SCCH and if the HS-SCCH is type 2, it computes an IR buffer offset and offsets of TBs of all TB sizes, for soft combining.

The MS performs second-rate dematching on currently received data and soft-combines the second rate-dematched data with the data at the buffer position. Then the MS performs first-rate dematching and channel decoding on the combined data.

For satisfactory operation, the IR buffer should meet certain requirements based on the following parameters. The MS applies blind decoding to initial transmission data with respect to every TB size and stores all of second rate-dematched data of the blind-decoded data in the IR buffer, for soft combining with retransmitted data.

Hence, sufficient memory areas should be allocated to buffer second rate-dematched data for all (four) TB sizes during one Transmission Time Interval (TTI). That is, the IR buffer should be able to store the data resulting from blind decoding of 13 successive TTIs for all TB sizes.

If a CRC check indicates that the currently received data from the BS is bad despite blind decoding for every TB size, the MS stores the currently received data for soft-combining with a retransmitted TB.

Since a maximum TB size is 1483 bits, a buffer size that the MS requires in the HS-SCCH-less mode is 231348 bits (=1483 bits×3 (coding rate)×13 (the number of monitoring TTIs)×4 (the number of available TB sizes)).

The 231348-bit buffer size imposes a constraint on the MS when receiving data. Accordingly, there exists a need for an apparatus and method for reducing the buffer size requirement.

SUMMARY OF THE INVENTION

An aspect of the present invention is to address at least the above-mentioned problems and/or disadvantages and to provide at least the advantages described below. Accordingly, an aspect of the present invention is to provide an apparatus and method for allocating a memory space in the case of not using an HS-SCCH in a mobile communication system.

Another aspect of the present invention is to provide an apparatus and method for reducing a required buffer size in HS-SCCH-less mode in a mobile communication system.

In accordance with an aspect of the present invention, a reception method of a receiver when a HS-SCCH is not used in a mobile communication system is provided. The method includes, receiving retransmission data, acquiring parameters, including information about initial transmission data, from the retransmission data, retrieving the initial transmission data from a second-rate dematching input buffer based on the information about the initial transmission data, performing second-rate dematching on the initial transmission data and the retransmission data, and generating first output data by soft-combining the second rate-dematched initial transmission data with the second rate-dematched retransmission data.

In accordance with another aspect of the present invention, a receiver for receiving data when a HS-SCCH is not used in a mobile communication system is provided. The receiver includes a controller for acquiring parameters including information about initial transmission data from received retransmission data, for retrieving the initial transmission data from a second-rate dematching input buffer based on the information about the initial transmission data, for performing second-rate dematching on the initial transmission data and the retransmission data, and for generating first output data by soft-combining the second rate-dematched initial transmission data with the second rate-dematched retransmission data, and a storage unit including the second-rate matching input buffer and an IR buffer.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention are intended to provide an apparatus and method for allocating a memory space in the case of not using an HS-SCCH in a mobile communication system.

Figure 1:
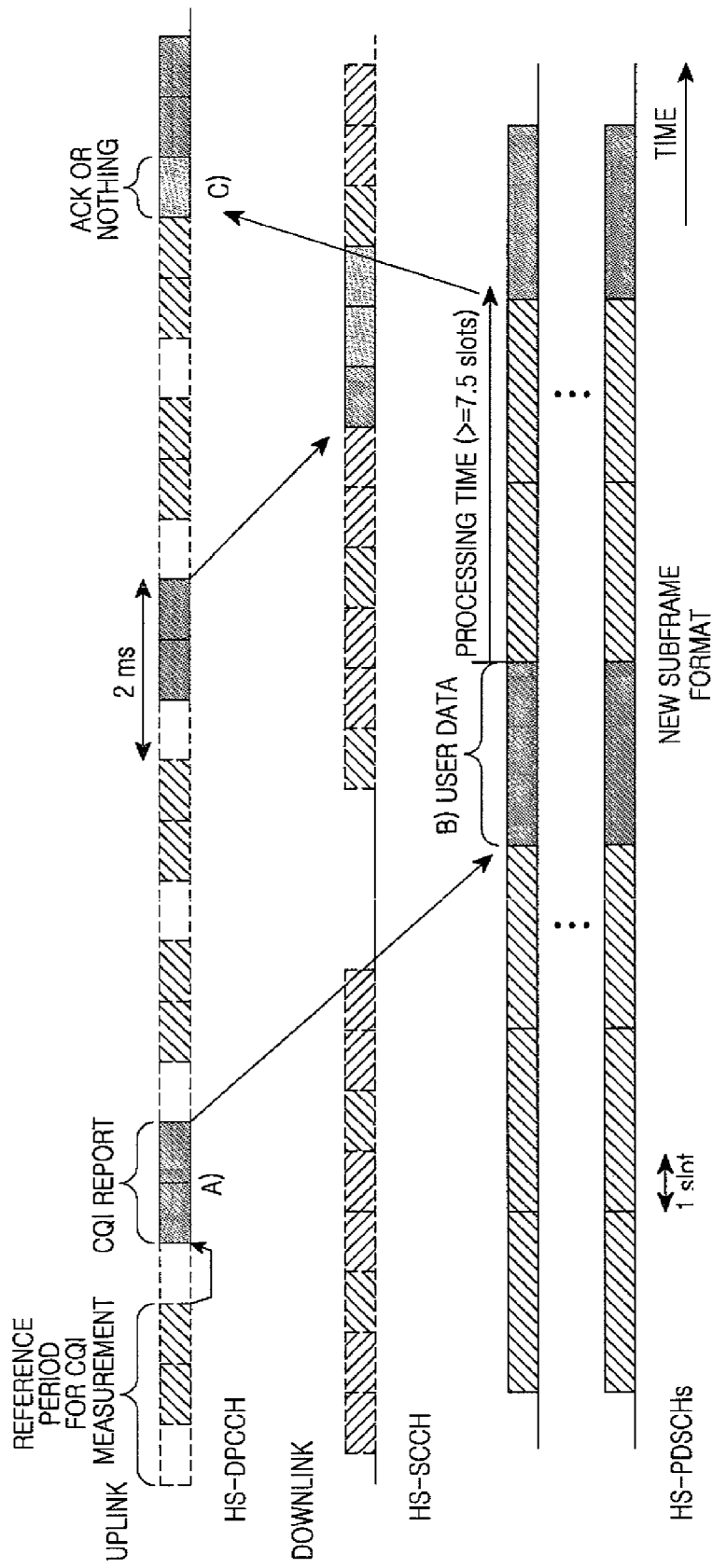
FIG. 1 illustrates a conventional operation for transmitting channels in HS-SCCH-less mode.
Figure 2:
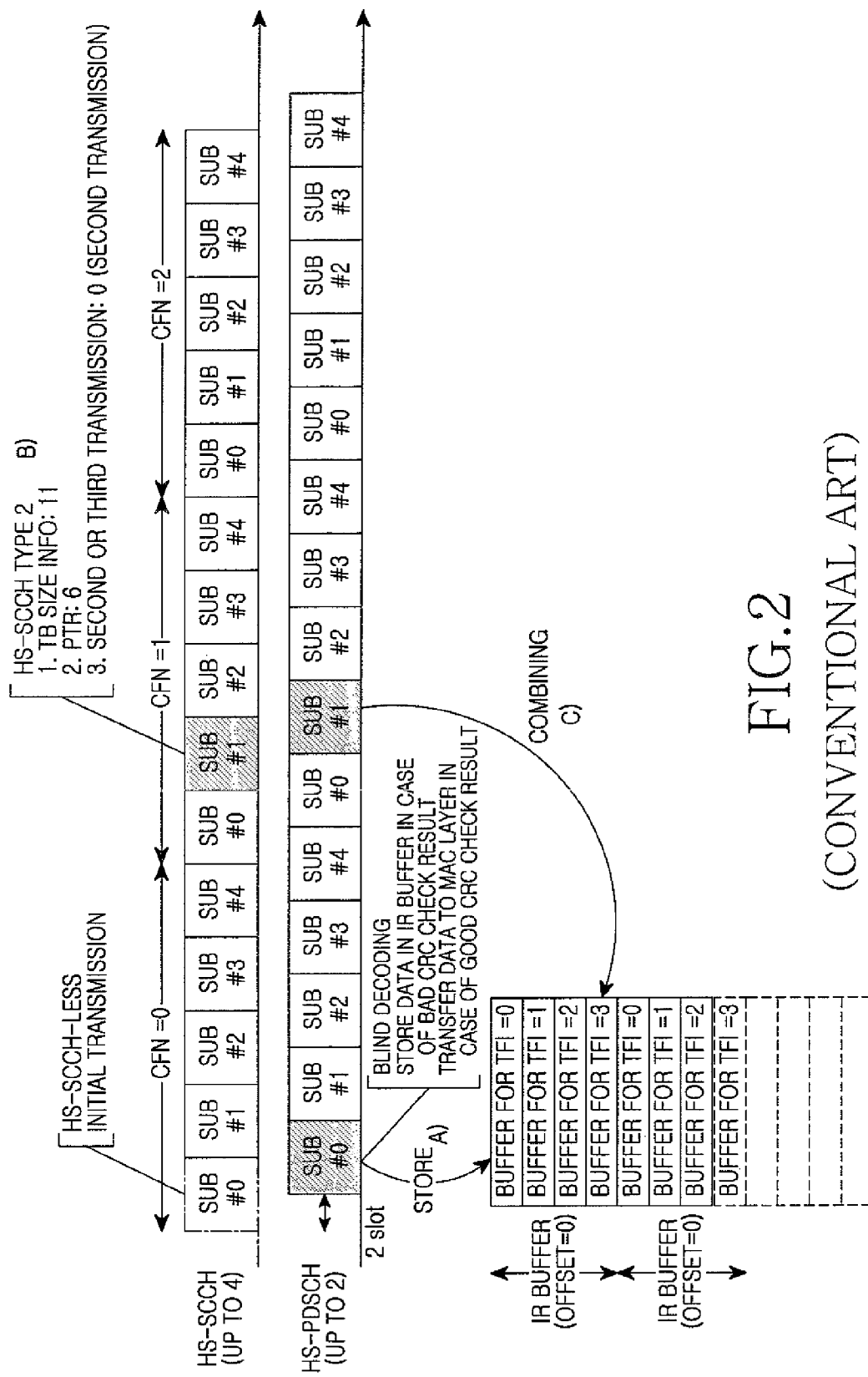
FIG. 2 is a timing diagram of a conventional MS operation.
Figure 3:
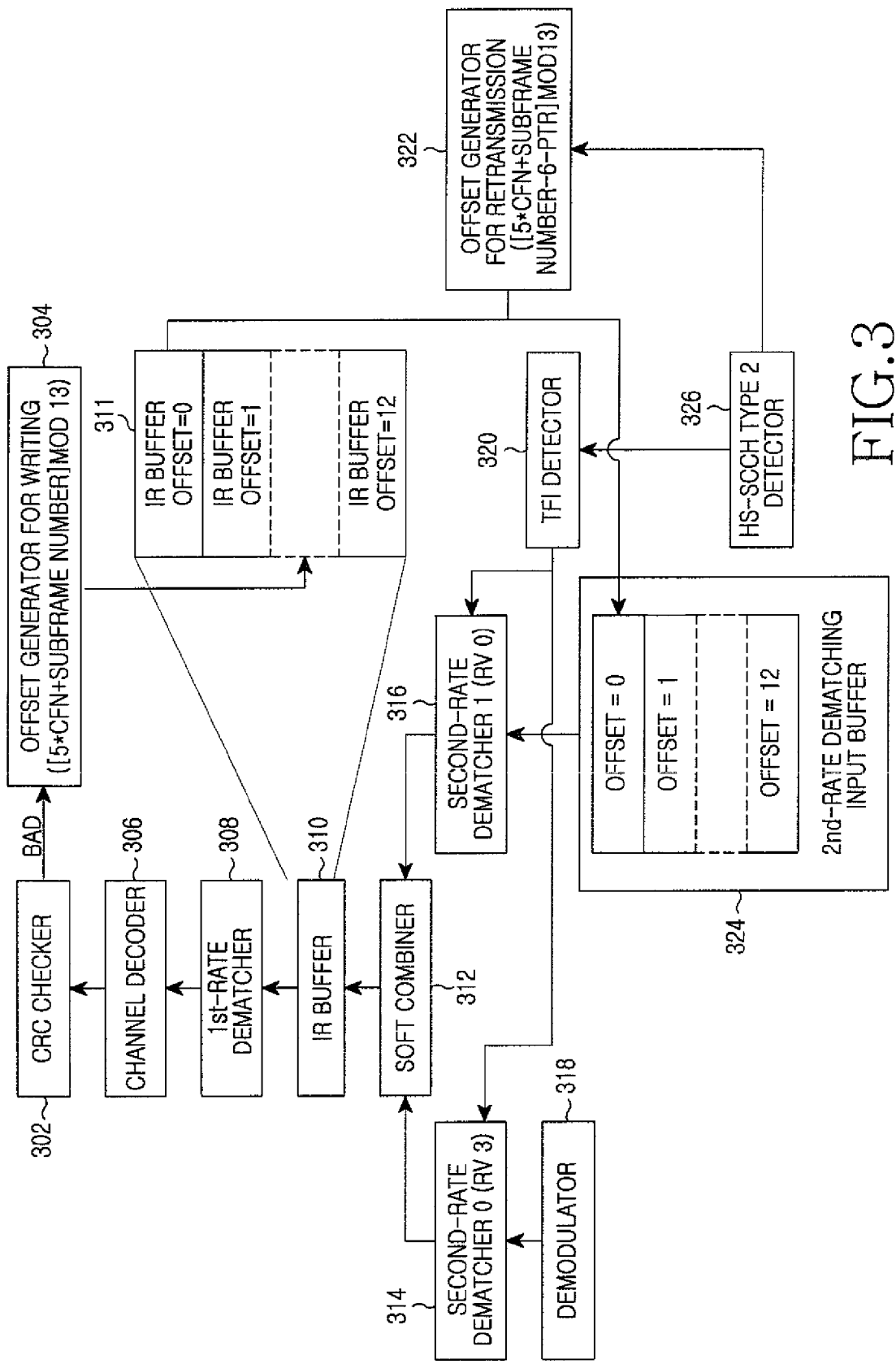
FIG. 3 is a block diagram of an MS according to an exemplary embodiment of the present invention.

FIG. 3 is a block diagram of an MS according to an exemplary embodiment of the present invention.

Referring to FIG. 3, an HS-SCCH type 2 detector 326 acquires control information from an HS-SCCH of type 2, when a retransmission takes place in HS-SCCH-less mode.

A demodulator 318 demodulates data received on an HS-PDSCH.

A Transport Format Indication (TFI) detector 320 detects a TFI during demodulation of the HS-SCCH.

An offset generator for retransmission 322 decides an offset of a second-rate dematching input buffer 324 and an offset of an IR buffer 310 to be accessed, when the retransmission is performed in the HS-SCCH-less mode.

When the CRC determination result of initial transmission data indicates an error after blind decoding with respect to every TB size, the second-rate dematching input buffer 324 buffers the demodulated initial transmission data.

Since it should store the demodulated data of 13 successive TTIs, the second-rate dematching input buffer 324 has 13 offsets and an offset to be assessed is determined by the offset generator 322 for retransmission.

When the retransmission occurs, the IR buffer 310, better shown in its expanded illustration 311, stores soft-combined data of the initial transmission data and retransmission data and manages the soft-combined data using a different offset for each of the 13 successive TTIs.

When a retransmission is performed, that is, an RV is 3, a second-rate dematcher 314 (second-rate dematcher 0) receives TB information (i.e. TB size information) from the TFI detector 320 and performs second-rate dematching on a current retransmission TB.

A second-rate dematcher 316 (second-rate dematcher 1) accesses the initial transmission data buffered in the second-rate dematching input buffer 324 according to an offset and performs second-rate matching on the initial transmission data, when the retransmission occurs.

A soft combiner 312 soft-combines the data received from second-rate dematcher 0 and second-rate dematcher 1.

A first-rate dematcher 308 performs first-rate dematching on the data received from the soft combiner 312.

A channel decoder 306 channel-decodes the data received from the first-rate dematcher 308.

A CRC checker 302 determines the CRC of the channel-decoded data.

If the result of the CRC determination indicates an error, an offset generator for writing 304 determines a position at which to buffer the current soft-combined data in the IR buffer 311.

While not shown, the MS is provided with a controller. The controller can control any or all of the offset generator 304 for writing, the CRC checker 302, the channel decoder 306, the first-rate dematcher 308, the soft combiner 312, the second-rate dematcher 1316, the second-rate dematcher 0 314, the TFI detector 320, the offset generator for retransmission 322, the demodulator 318, and the HS-SCCH type 2 detector 326.

Also, the functions of the offset generator 304 for writing, the CRC checker 302, the channel decoder 306, the first-rate dematcher 308, the soft combiner 312, the second-rate dematcher 1 316, the second-rate dematcher 0 314, the TFI detector 320, the offset generator for retransmission 322, the demodulator 318, and the HS-SCCH type 2 detector 326 can be incorporated in the controller. That is, while these components are shown separately, such illustration is only made in order to describe their functions separately. It is not to be construed as requiring the components to be provided separately.

Therefore, in actual implementation, the MS can be so configured that the controller performs all or part of the functions of the offset generator 304 for writing, the CRC checker 302, the channel decoder 306, the first-rate dematcher 308, the soft combiner 312, the second-rate dematcher 1 316, the second-rate dematcher 0 314, the TFI detector 320, the offset generator for retransmission 322, the demodulator 318, and the HS-SCCH type 2 detector 326.

While not shown, the MS is provided with a storage unit. The storage unit may include the IR buffer 310 and the second-rate dematching input buffer 324.

Figure 4:
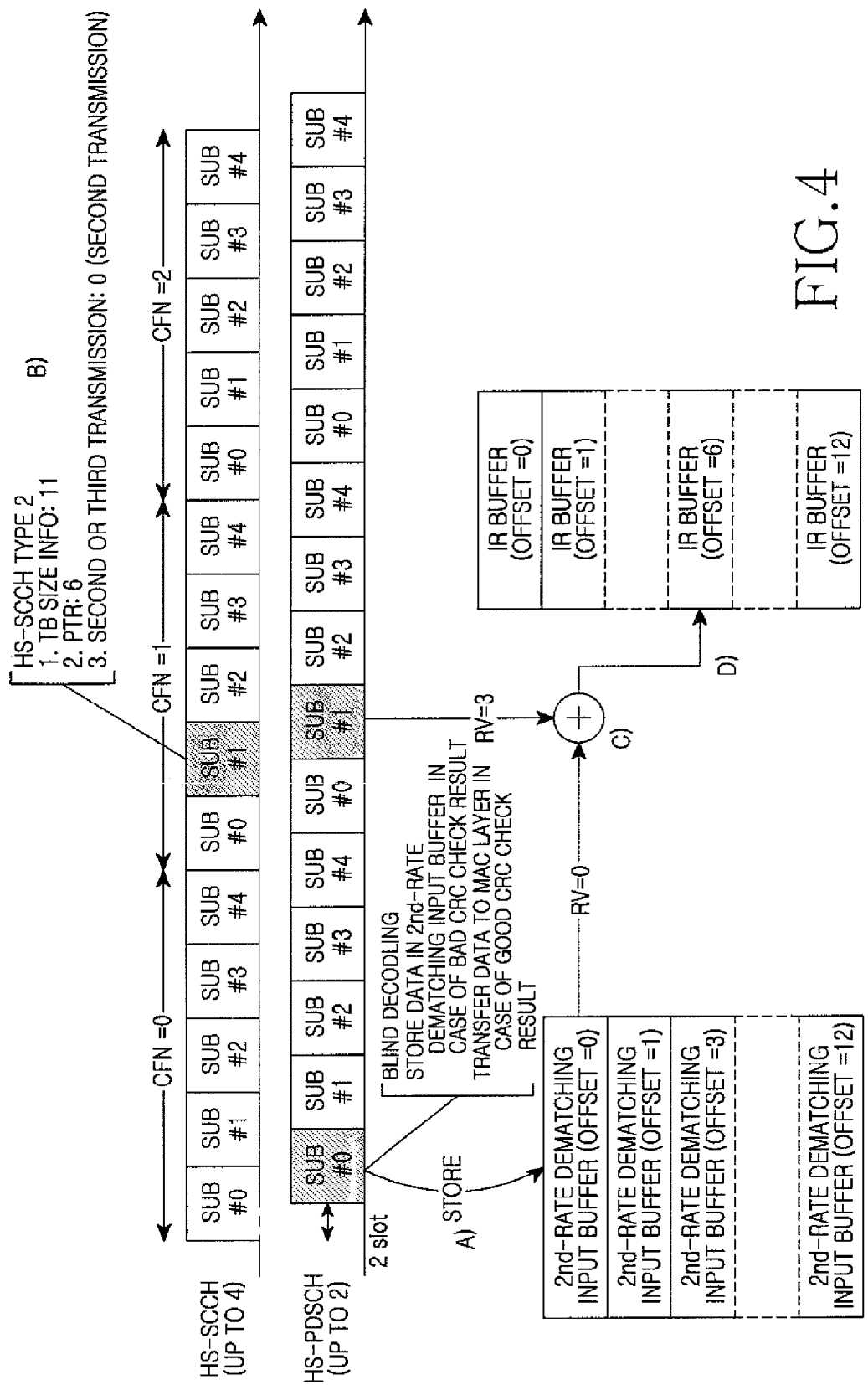
FIG. 4 is a timing diagram of an operation of an MS according to an exemplary embodiment of the present invention.

FIG. 4 is a timing diagram of an operation of an MS according to an exemplary embodiment of the present invention.

Referring to FIG. 4, after entering the HS-SCCH-less mode, the MS operates as follows. First, the MS demodulates an initial transmission HS-PDSCH. If evaluation of the CRC of the demodulated HS-PDSCH indicates an error with respect to every TB size, the MS buffers the demodulated data in the second-rate dematching input buffer in step A).

If a received HS-SCCH is type 2, indicating retransmission in step B), the MS retrieves the initial transmission data and soft-combines the initial transmission data with retransmission data using control information acquired from the HS-SCCH in step C).

Then the MS buffers the soft-combined data at a preset offset of the IR buffer in step D).

Figure 5:
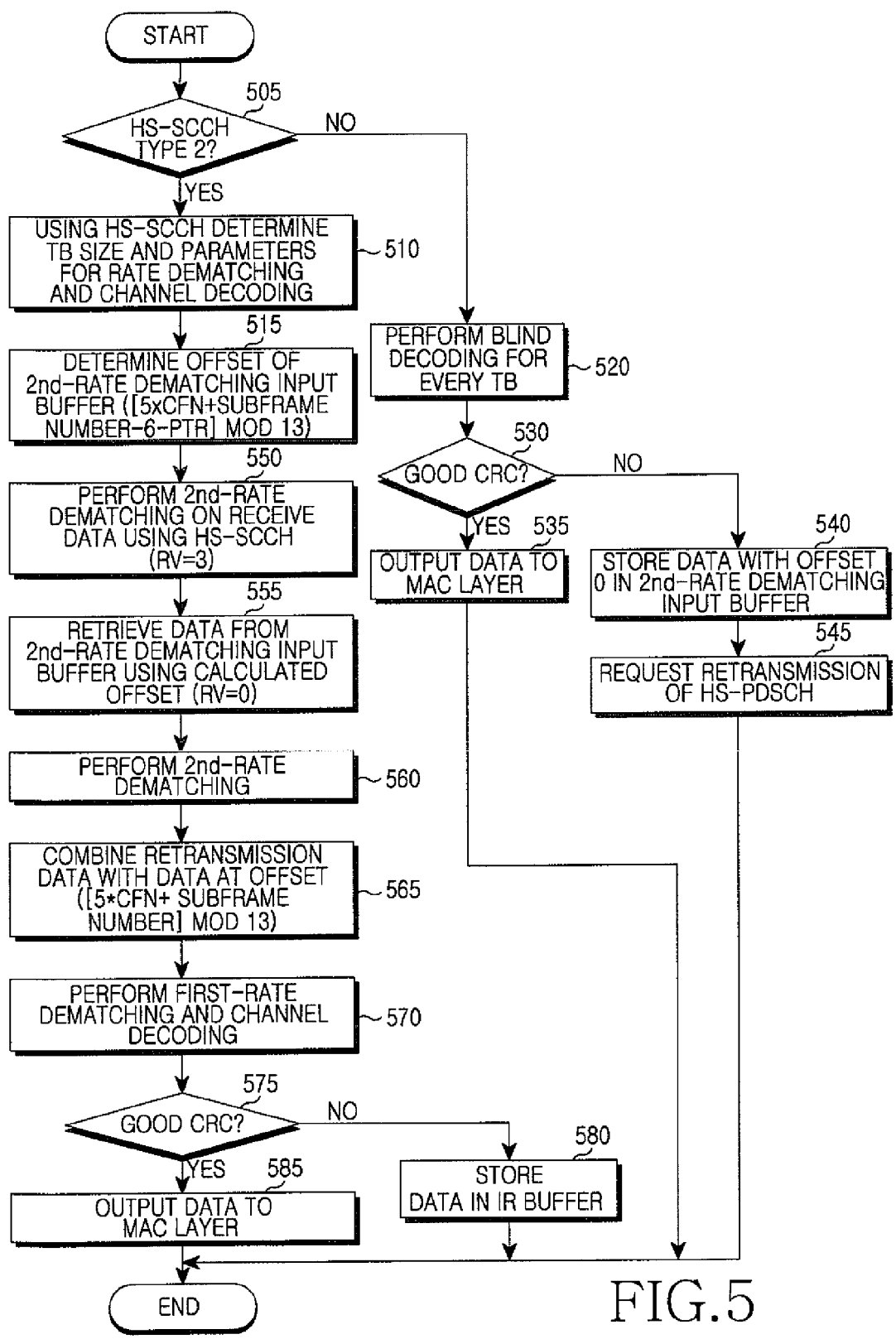
FIG. 5 is a flowchart illustrating an operation of an MS according to an exemplary embodiment of the present invention.

FIG. 5 is a flowchart illustrating an operation of an MS according to an exemplary embodiment of the present invention.

Referring to FIG. 5, the MS receives an HS-SCCH and determines whether the HS-SCCH is type 2 in step 505.

If the HS-SCCH is not type 2, which implies an initial transmission, the MS performs blind decoding on a currently received HS-PDSCH with respect to every TB size in step 520.

If a CRC determination result of the blind-decoded HS-PDSCH is good in step 530, the MS provides data included in the HS-PDSCH to a MAC layer in step 535 and then completes the process.

If the CRC determination result of the blind-decoded HS-PDSCH is bad in step 530, the MS buffers the demodulated data of the HS-PDSCH in the second-rate dematching input buffer in step 540.

An offset at which the demodulated data is buffered is computed by $$\text{Offset of second-rate dematching input buffer} = [5 \times CFN + \text{subframe number}] \mod 13 \quad (3)$$

where CFN represents Connected Frame Number.

After buffering the demodulated data, the MS requests retransmission of the HS-PDSCH in step 545.

If it is determined in step 505 that the HS-SCCH is type 2, the MS determines that the currently received data is retransmission data in the HS-SCCH-less mode.

Thus, the MS determines parameters associated with rate dematching and channel decoding based on a TB size, a retransmission number, and a PTR included in the HS-SCCH in step 510.

In step 515, the MS determines a TB offset associated with the previous transmission using the PTR by $$\text{Previous offset of second-rate dematching input buffer} = [5 \times CFN + \text{subframe number} - 6 - PTR] \mod 13 \quad (4)$$

where PTR represents "Pointer to the previous transmission" and CFN represents Connected Frame Number.

In step 550, the MS performs second-rate dematching on the retransmission data.

The MS then accesses the second-rate dematching input buffer using the offset computed by equation (4) in step 555, retrieves an initial transmission TB from the offset, and performs second-rate dematching on the initial transmission TB in step 560.

In step 565, the MS soft-combines the retransmission data with the initial transmission data and buffers the soft-combined data in the IR buffer at an offset computed by $$\text{Offset of IR buffer} = [5 \times CFN + \text{subframe number}] \mod 13 \quad (5)$$

where CFN represents Connected Frame Number.

The MS performs first-rate dematching and channel decoding on the soft-combined data in step 570.

The MS determines the CRC of the channel-decoded data in step 575. If the CRC determination result is good, the MS provides the channel-decoded data to the MAC layer in step 585. Furthermore, if the CRC determination is good, the data stored in the IR buffer in step 565 may be deleted in step 585.

On the contrary, if the CRC determination result is bad in step 575, the MS buffers the soft-combined data in the IR buffer at an offset computed by equation (5) in step 580.

If the CRC determination result of the data buffered in the IR buffer is also bad and thus a third transmission (i.e. a second retransmission) takes place, soft combining is performed at the IR buffer.

Then the algorithm of the present invention ends.

Compared to the conventional technology that has a buffer size requirement of 231348 bits (1483 bits×3 (coding rate)×13 (the number of monitoring TTIs)×4 (the number of available TB sizes)), exemplary embodiments of the present invention require a buffer size of only 82797 bits ((960 bits (QPSK)×2 (the number of HS-PDSCHs)×13 (the number of monitoring TTIs)=24960 bits)+(1483 bits×3 (coding rate)×13 (the number of monitoring TTIs)=57837 bits).

Therefore, exemplary embodiments of the present invention can save 148551-bits of buffer size, relative to the conventional technology. That is, the buffer size requirement is reduced to about ⅓ of the conventional buffer size requirement.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A reception method in a receiver when a High-Speed Shared Control CHannel (HS-SCCH) is not used in a mobile communication system, the method comprising:
    receiving retransmission data;
    acquiring parameters, including information about initial transmission data, from the retransmission data;
    retrieving the initial transmission data from a second-rate dematching input buffer based on the information about the initial transmission data;
    performing second-rate dematching on the initial transmission data and the retransmission data; and
    generating first output data by soft-combining the second rate-dematched initial transmission data with the second rate-dematched retransmission data.

2. The method of claim 1, further comprising:
    buffering the first output data in an Incremental Redundancy (IR) buffer and performing first rate dematching on the first output data;
    channel-decoding the first rate-dematched first output data; and
    providing the channel-decoded first output data to an upper layer if a Cyclic Redundancy Check (CRC) determination result of the channel-decoded first output data is good.

3. The method of claim 2, further comprising deleting the first output data from the IR buffer, if the CRC determination result of the channel-decoded first output data is good.

4. The method of claim 1, further comprising, before the receiving of the retransmission data:
    receiving the initial transmission data;
    performing blind decoding on the initial transmission data;
    providing the initial transmission data to an upper layer if a CRC determination result of the blind-decoded initial transmission data is good; and
    buffering the initial transmission data in the second-rate dematching input buffer if the CRC determination result of the blind-decoded initial transmission data is bad.

5. The method of claim 4, wherein the buffering of the initial transmission data in the second-rate dematching input buffer comprises buffering the initial transmission data at an offset computed by $$\text{Offset of second-rate dematching input buffer}=[5\times CFN+\text{subframe number}] \bmod 13$$

where CFN represents a Connected Frame Number.

6. The method of claim 1, wherein the retrieving of the initial transmission data comprises:
    determining an offset of the initial transmission data in the second-rate dematching input buffer; and
    retrieving the initial transmission data using the offset.

7. The method of claim 6, wherein the determining of the offset of the initial transmission data in the second-rate dematching input buffer comprises determining the offset using a pointer indicating the initial transmission data, included in the information about the initial transmission data by $$\text{Previous offset of second-rate dematching input buffer}=[5\times CFN+\text{subframe number}-6-PTR] \bmod 13$$

where PTR represents the pointer indicating the initial transmission data and CFN represents Connected Frame Number.

8. The method of claim 2, wherein the buffering of the first output data in the IR buffer comprises buffering the first output data in the IR buffer at an offset computed by $$\text{Offset of IR buffer}=[5\times CFN+\text{subframe number}] \bmod 13$$

where CFN represents Connected Frame Number.

9. A receiver for receiving data when a High-Speed Shared Control CHannel (HS-SCCH) is not used in a mobile communication system, the receiver comprising:
    a controller for receiving retransmission data, for acquiring parameters including information about initial transmission data from the received retransmission data, for retrieving the initial transmission data from a second-rate dematching input buffer based on the information about the initial transmission data, for performing second-rate dematching on the initial transmission data and the retransmission data, and for generating first output data by soft-combining the second rate-dematched initial transmission data with the second rate-dematched retransmission data; and
    a storage unit including the second rate matching input buffer and an Incremental Redundancy (IR) buffer.

10. The receiver of claim 9, wherein the controller buffers the first output data in the IR buffer, performs first rate dematching on the first output data, channel-decodes the first rate-dematched first output data, and provides the channel-decoded first output data to an upper layer if a Cyclic Redundancy Check (CRC) determination result of the channel-decoded first output data is good.

11. The receiver of claim 10, wherein the controller deletes the first output data from the IR buffer if the CRC determination result of the channel-decoded first output data is good.

12. The receiver of claim 9, wherein before the receiving of the retransmission data, the controller receives the initial transmission data, performs blind decoding on the initial transmission data, provides the initial transmission data to an upper layer if a CRC determination result of the blind-decoded initial transmission data is good, and buffers the initial transmission data in the second-rate dematching input buffer if the CRC determination result of the blind-decoded initial transmission data is bad.

13. The receiver of claim 12, wherein the controller buffers the initial transmission data at an offset computed by Offset of second-rate dematching input buffer=[5×$CFN$+subframe number] mod 13 where CFN represents Connected Frame Number.

14. The receiver of claim 9, wherein the controller retrieves the initial transmission data from the second-rate dematching input buffer by determining an offset of the initial transmission data in the second-rate dematching input buffer and retrieving the initial transmission data using the offset.

15. The receiver of claim 14, wherein the controller determines the offset of the initial transmission data in the second-rate dematching input buffer using a pointer indicating the initial transmission data, included in the information about the initial transmission data by Previous offset of second-rate dematching input buffer=[5×$CFN$+subframe number−6−$PTR$] mod 13 where PTR represents the pointer indicating the initial transmission data and CFN represents Connected Frame Number.

16. The receiver of claim 9, wherein the controller buffers the first output data in the IR buffer at an offset computed by Offset of $IR$ buffer=[5×$CFN$+subframe number] mod 13 where CFN represents Connected Frame Number.

17. A reception method in a receiver, the method comprising:
    receiving High Speed-Shared Control CHanel (HS-SCCH) data;
    determining if the HS-SCCH data indicates retransmission of data;
    if the HS-SCCH data indicates the retransmission of data, acquiring parameters, including information about initial transmission data, from the retransmission data;
    retrieving the initial transmission data based on the information about the initial transmission data;
    performing second-rate dematching on the initial transmission data and the retransmission data; and
    generating output data by soft-combining the second rate-dematched initial transmission data with the second rate-dematched retransmission data.

18. The method of claim 17, further comprising:
    buffering the output data;
    performing first rate dematching on the output data;
    channel-decoding the first rate-dematched output data; and
    providing the channel-decoded output data to an upper layer if a Cyclic Redundancy Check (CRC) determination result of the channel-decoded output data is good.

19. The method of claim 17, further comprising:
    if the HS-SCCH data does not indicate the retransmission of data, performing blind decoding on the initial transmission data;
    providing the initial transmission data to an upper layer if a CRC determination result of the blind-decoded initial transmission data is good; and
    buffering the initial transmission data and requesting retransmission of the initial data if the CRC determination result of the blind-decoded initial transmission data is bad.

* * * * *